US012767026B2

(12) United States Patent
Sanderson et al.

(10) Patent No.: US 12,767,026 B2
(45) Date of Patent: Oct. 20, 2026

(54) VEHICLE SIGNAL SYSTEM HAVING A PLURALITY OF FORCE GENERATORS FOR PRODUCING A USER-EXPERIENCED FEEDBACK

(71) Applicant: GHSP, Inc., Holland, MI (US)

(72) Inventors: Bradley Sanderson, Pentwater, MI (US); Mark Norris, Apex, NC (US); Stefan Barbulescu, Fuquay Varina, NC (US); Marty Bieber, Apex, NC (US); Nathan Houston, Pittsboro, NC (US)

(73) Assignee: GHSP, INC., Holland, MI (US)

( * ) Notice: Subject to any disclaimer, the term of this patent is extended or adjusted under 35 U.S.C. 154(b) by 409 days.

(21) Appl. No.: 18/126,678

(22) Filed: Mar. 27, 2023

(65) Prior Publication Data

US 2023/0311733 A1 Oct. 5, 2023

Related U.S. Application Data

(60) Provisional application No. 63/397,911, filed on Aug. 15, 2022, provisional application No. 63/325,177, filed on Mar. 30, 2022.

(51) Int. Cl.

| | |
|---|---|
| ***B60Q 9/00*** | (2006.01) |
| ***B60K 35/00*** | (2024.01) |
| ***B60K 35/25*** | (2024.01) |
| ***B60K 35/28*** | (2024.01) |
| ***B60K 35/60*** | (2024.01) |
| ***B60N 2/90*** | (2018.01) |

(52) U.S. Cl.
CPC ................ *B60N 2/90* (2018.02); *B60K 35/25* (2024.01); *B60K 35/28* (2024.01); *B60K 35/60* (2024.01); *B60Q 9/00* (2013.01); *B60N 2002/981* (2018.02)

(58) Field of Classification Search
None
See application file for complete search history.

(56) References Cited

U.S. PATENT DOCUMENTS

| | | | |
|---|---|---|---|
| 7,675,432 | B2 | 3/2010 | Leicht |
| 9,718,477 | B2 | 8/2017 | Truong |
| 10,229,595 | B2 | 3/2019 | Loeillet et al. |
| 10,232,773 | B2 | 3/2019 | Modarres et al. |

(Continued)

FOREIGN PATENT DOCUMENTS

| | | | |
|---|---|---|---|
| DE | 102016200899 | A1 | 7/2017 |
| FR | 3076503 | A1 | 7/2019 |

(Continued)

*Primary Examiner* — James M Mcpherson
(74) *Attorney, Agent, or Firm* — Price Heneveld LLP

(57) ABSTRACT

A vehicle includes a frame. A body is coupled with the frame and defines a passenger cabin therein. The body has a plurality of interior sensors and a plurality of exterior sensors. A plurality of seating positions are within the passenger cabin. Each seating position has a plurality of occupant touch points. A plurality of force generators are positioned proximate the occupant touch points. A controller is in communication with the plurality of interior sensors, the plurality of exterior sensors and the plurality of force generators. The controller operates the plurality of force generators in response to sensed feedback from at least one sensor of the plurality of interior sensors and the plurality of exterior sensors.

20 Claims, 8 Drawing Sheets

(56) References Cited

U.S. PATENT DOCUMENTS

| | | | | |
|---|---|---|---|---|
| 10,399,492 | B1 | 9/2019 | Paraskevas et al. | |
| 10,457,179 | B1 * | 10/2019 | Kentley-Klay | B60N 2/879 |
| 10,836,309 | B1 * | 11/2020 | Trundle | G08G 1/0116 |
| 10,915,175 | B2 | 2/2021 | Marti et al. | |
| 10,926,712 | B2 | 2/2021 | Wheeler et al. | |
| 11,618,320 | B1 * | 4/2023 | Austria | B60K 35/10<br>701/36 |
| 11,654,939 | B2 * | 5/2023 | Jeon | B60W 60/0053<br>701/36 |
| 2007/0109104 | A1 | 5/2007 | Altan et al. | |
| 2013/0342365 | A1 | 12/2013 | Kiefer et al. | |
| 2017/0267286 | A1 * | 9/2017 | Takamatsu | B60W 30/12 |
| 2018/0005528 | A1 | 1/2018 | Loeillet et al. | |
| 2018/0056867 | A1 | 3/2018 | Modarres et al. | |
| 2019/0202331 | A1 | 7/2019 | Cimatti | |
| 2019/0276051 | A1 | 9/2019 | Marti et al. | |
| 2019/0357834 | A1 * | 11/2019 | Aarts | A61B 5/7246 |
| 2020/0079288 | A1 * | 3/2020 | Yamamoto | G08B 21/182 |
| 2020/0239022 | A1 | 7/2020 | Hashimoto et al. | |
| 2020/0361395 | A1 | 11/2020 | Wheeler et al. | |
| 2021/0237578 | A1 * | 8/2021 | Ing | B60L 3/0069 |
| 2021/0356012 | A1 * | 11/2021 | Norris | B62D 7/224 |
| 2023/0173979 | A1 * | 6/2023 | Hagelis | B60W 40/02 |
| 2024/0010222 | A1 * | 1/2024 | Paradis | B60W 50/14 |

FOREIGN PATENT DOCUMENTS

| | | | |
|---|---|---|---|
| JP | 5093603 | B2 | 12/2012 |
| KR | 20150086912 | A | 7/2015 |
| WO | 2020104083 | A1 | 5/2020 |
| WO | 2021228488 | A1 | 11/2021 |

* cited by examiner

VEHICLE SIGNAL SYSTEM HAVING A PLURALITY OF FORCE GENERATORS FOR PRODUCING A USER-EXPERIENCED FEEDBACK

CROSS-REFERENCE TO RELATED APPLICATION

This application claims priority to and the benefit under 35 U.S.C. § 119(e) of U.S. Provisional Patent Application No. 63/325,177, filed on Mar. 30, 2022, entitled VEHICLE ALERT SIGNAL HAVING A CIRCULAR FORCE GENERATOR, and U.S. Provisional Patent Application No. 63/397,911, filed on Aug. 15, 2022, entitled VEHICLE ALERT SIGNAL HAVING A SYSTEM OFR FORCE GENERATORS FOR PRODUCING A USER-EXPERIENCED FEEDBACK, the entire disclosures of which are hereby incorporated herein by reference.

FIELD OF THE INVENTION

The present invention generally relates to vehicles, and more specifically, a system for providing an signal, in the form on a haptic signal, an auditory signal, or both, to one or more occupants of a vehicle that utilizes a plurality of force generators to provide a signal having a three-dimensional component that can be used to relate the signal to a specific portion of the vehicle.

BACKGROUND OF THE INVENTION

Various vehicles include alert signals that provide information related to certain systems of the vehicle. These alert signals are typically in the form of lights within a heads-up display or console, certain vibrations that are provided within a steering wheel, auditory signals, and other signals that can be seen, heard or felt by the operator of the vehicle.

SUMMARY OF THE INVENTION

According to one aspect of the present disclosure, a vehicle includes a frame. A body is coupled with the frame and defines a passenger cabin therein. The body has a plurality of interior sensors and a plurality of exterior sensors. A plurality of seating positions are within the passenger cabin. Each seating position has a plurality of occupant touch points. A plurality of force generators are positioned proximate the occupant touch points. A controller is in communication with the plurality of interior sensors, the plurality of exterior sensors and the plurality of force generators. The controller operates the plurality of force generators in response to sensed feedback from at least one sensor of the plurality of interior sensors and the plurality of exterior sensors.

According to another aspect of the present disclosure, an electrically-powered vehicle includes a frame. A body is coupled with the frame and defines a passenger cabin therein. The body has a plurality of interior sensors and a plurality of exterior sensors. The body and the frame incorporate a plurality of resonating substrates. A plurality of seating positions are within the passenger cabin. Each seating position is located adjacent to at least one resonating substrate of the plurality of resonating substrates. A plurality of force generators are positioned in communication with the plurality of resonating substrates, respectively. A controller is in communication with the plurality of interior sensors, the plurality of exterior sensors and the plurality of force generators. The controller operates the plurality of force generators to act on at least one of the plurality of resonating substrates in response to sensed feedback from at least one sensor of the pluralities of interior sensors and exterior sensors.

According to another aspect of the present disclosure, a vehicle includes a frame. A body is coupled with the frame and defines a passenger cabin therein. The body has a plurality of interior sensors and a plurality of exterior sensors. A plurality of resonating substrates are incorporated into at least one of the frame and the body. A plurality of seating positions are within a passenger cabin. Each seating position has a plurality of occupant touch points. A first plurality of force generators are positioned proximate the plurality of resonating substrates. The first plurality of force generators are selectively operating on a portion of the plurality of resonating substrates to produce an auditory signal. A second plurality of force generators are positioned proximate the occupant touch points. The second plurality of force generators operate cooperatively with the occupant touch points to produce at least a haptic signal. A controller is in communication with the plurality of interior sensors, the plurality of exterior sensors, the plurality of force generators, and the second plurality of force generators. The controller operates the first plurality and the second plurality of force generators in response to sensed feedback from at least one sensor of the pluralities of interior sensors and exterior sensors to generate a three-dimensional signal that includes the auditory signal and the haptic signal.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
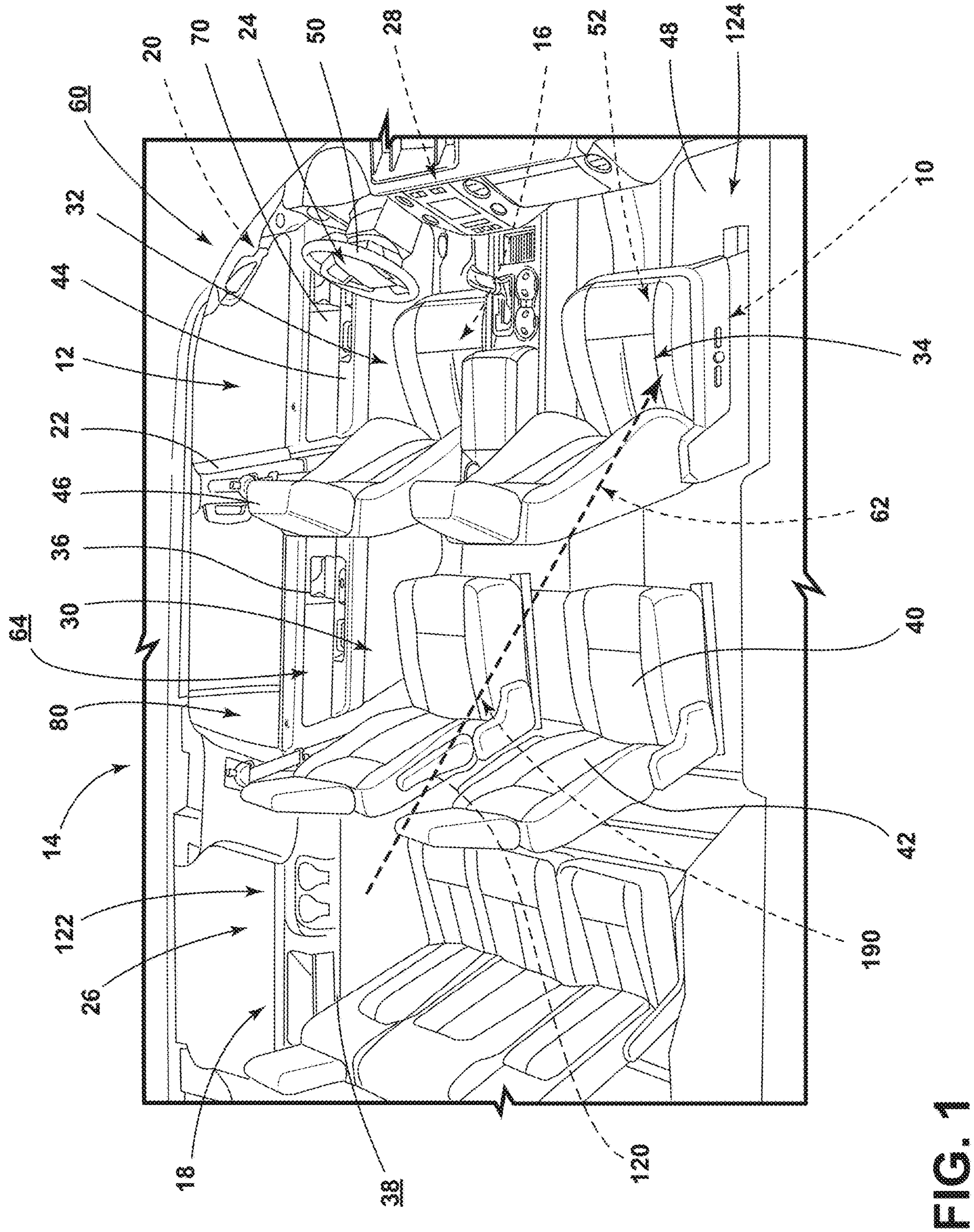
FIG. 1 is a top perspective view of a passenger cabin for a vehicle that incorporates an aspect of the three-dimensional signaling system.
Figure 2:
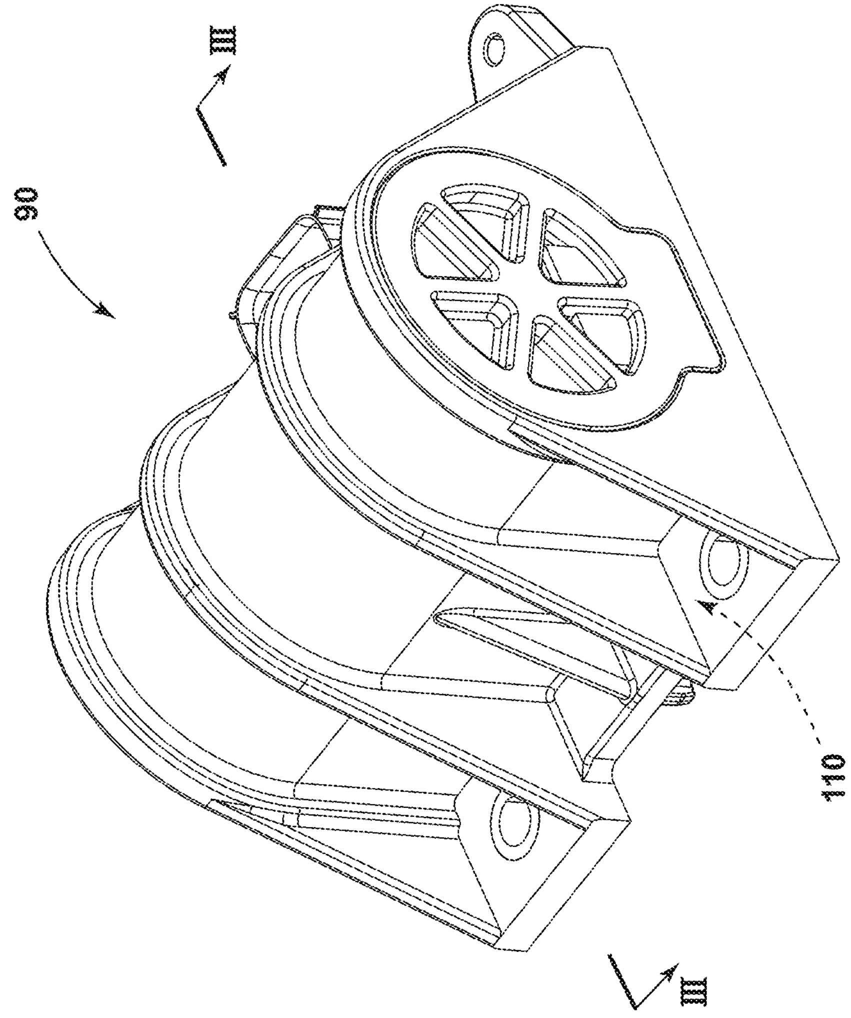
FIG. 2 is a perspective view of a force generator that is used within the three-dimensional signaling system.
Figure 3:
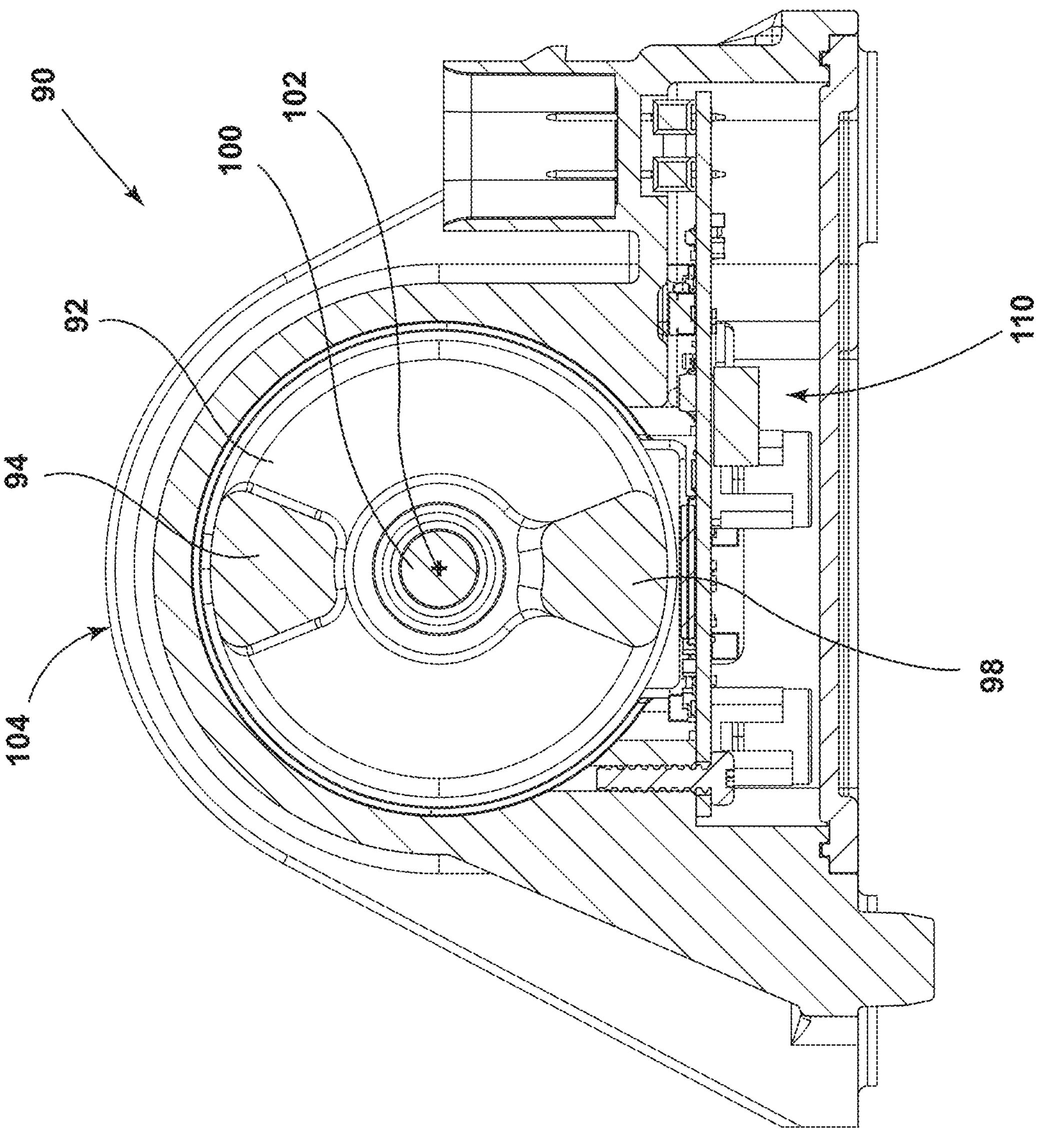
FIG. 3 is a cross-sectional view of the circular force generator of FIG. 2 taken along line III-III.
Figure 4:
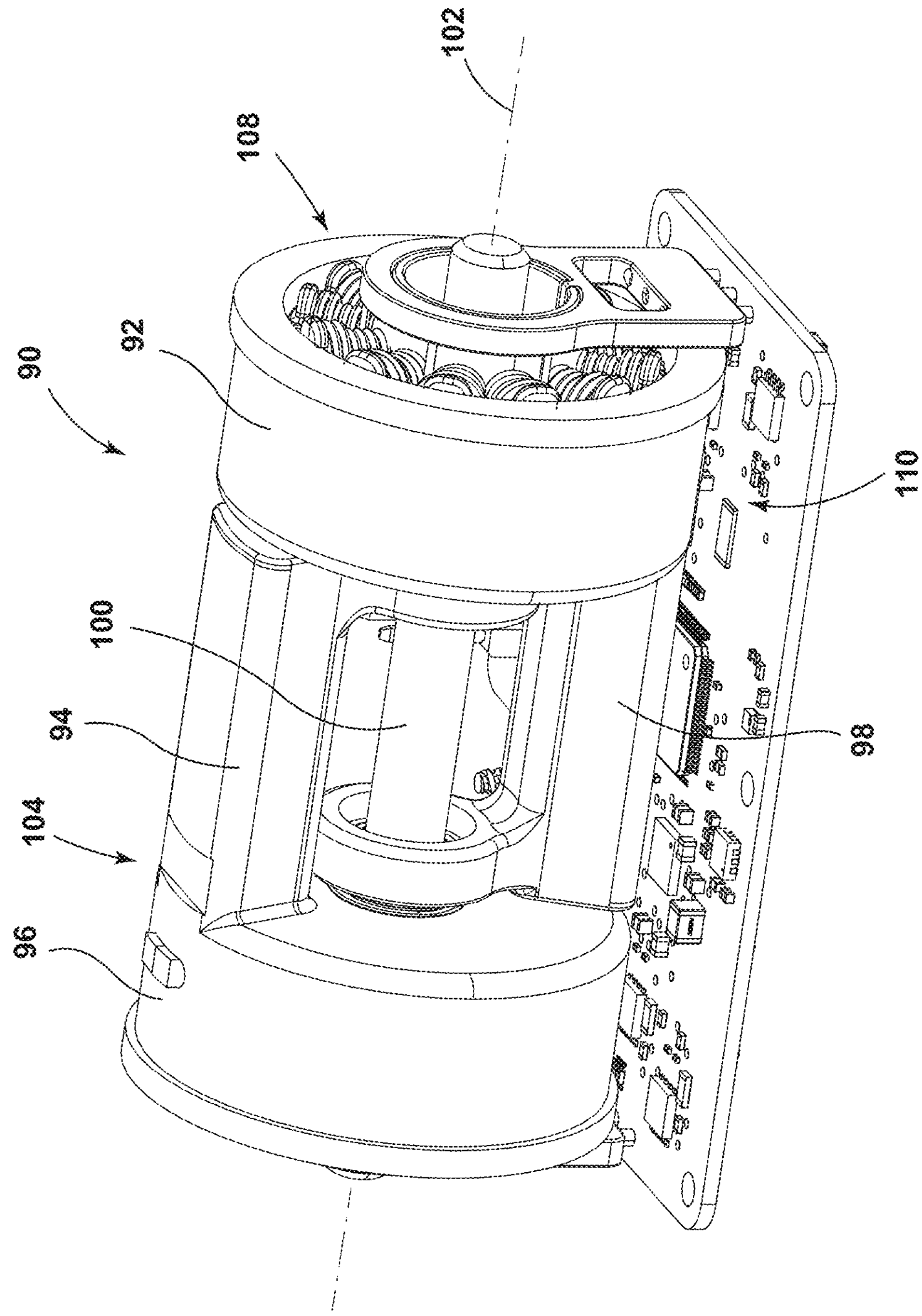
FIG. 4 is a perspective view of first and second rotors of a force generator that operates to produce a portion of the signal for the three-dimensional signaling system.
Figure 6:
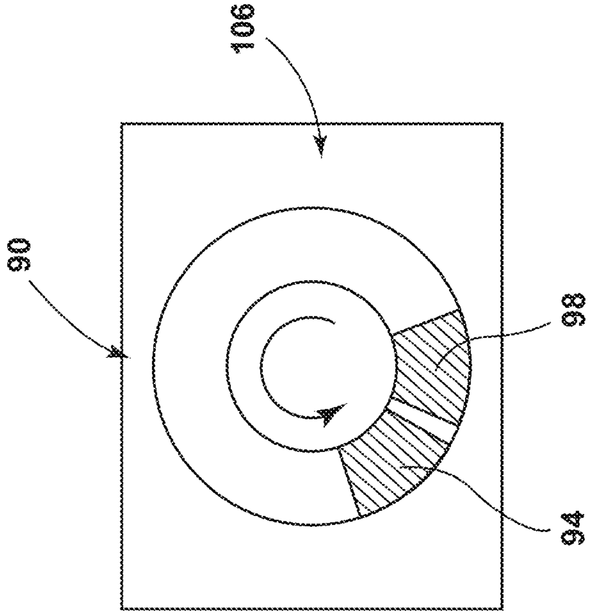
FIGS. 5-6 are schematic diagrams illustrating operation of the first and second rotors of the force generator for producing a component of the signal for the three-dimensional signaling system.
Figure 5:
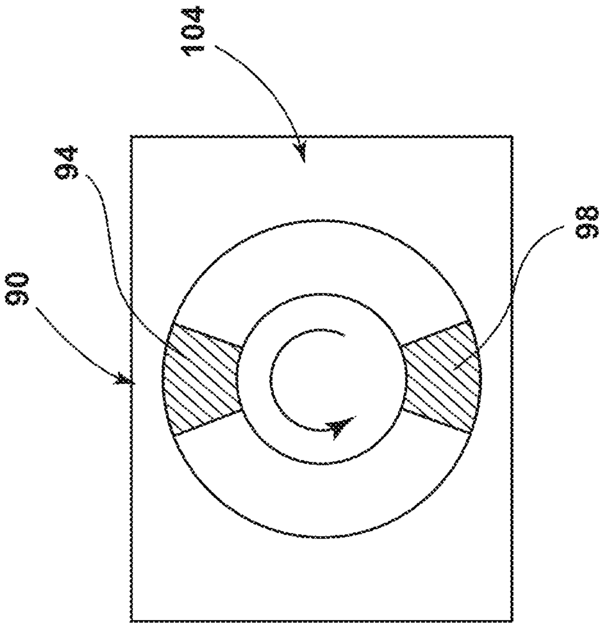
Figure 7:
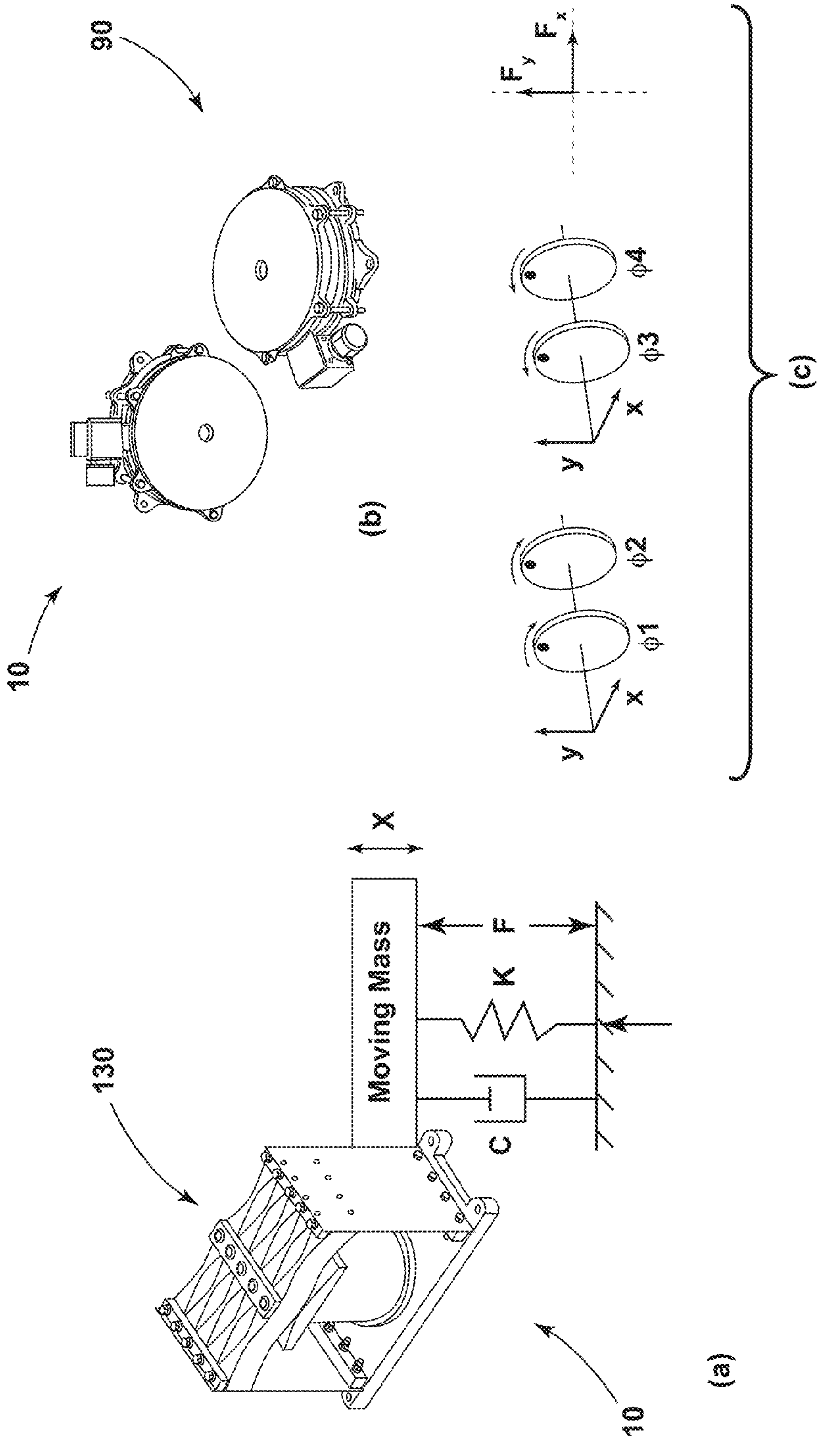
FIGS. 7 (*a*)-(*c*) are various schematic views of exemplary and non-limiting force generators that can be utilized within the three-dimensional signaling system.
Figure 8:
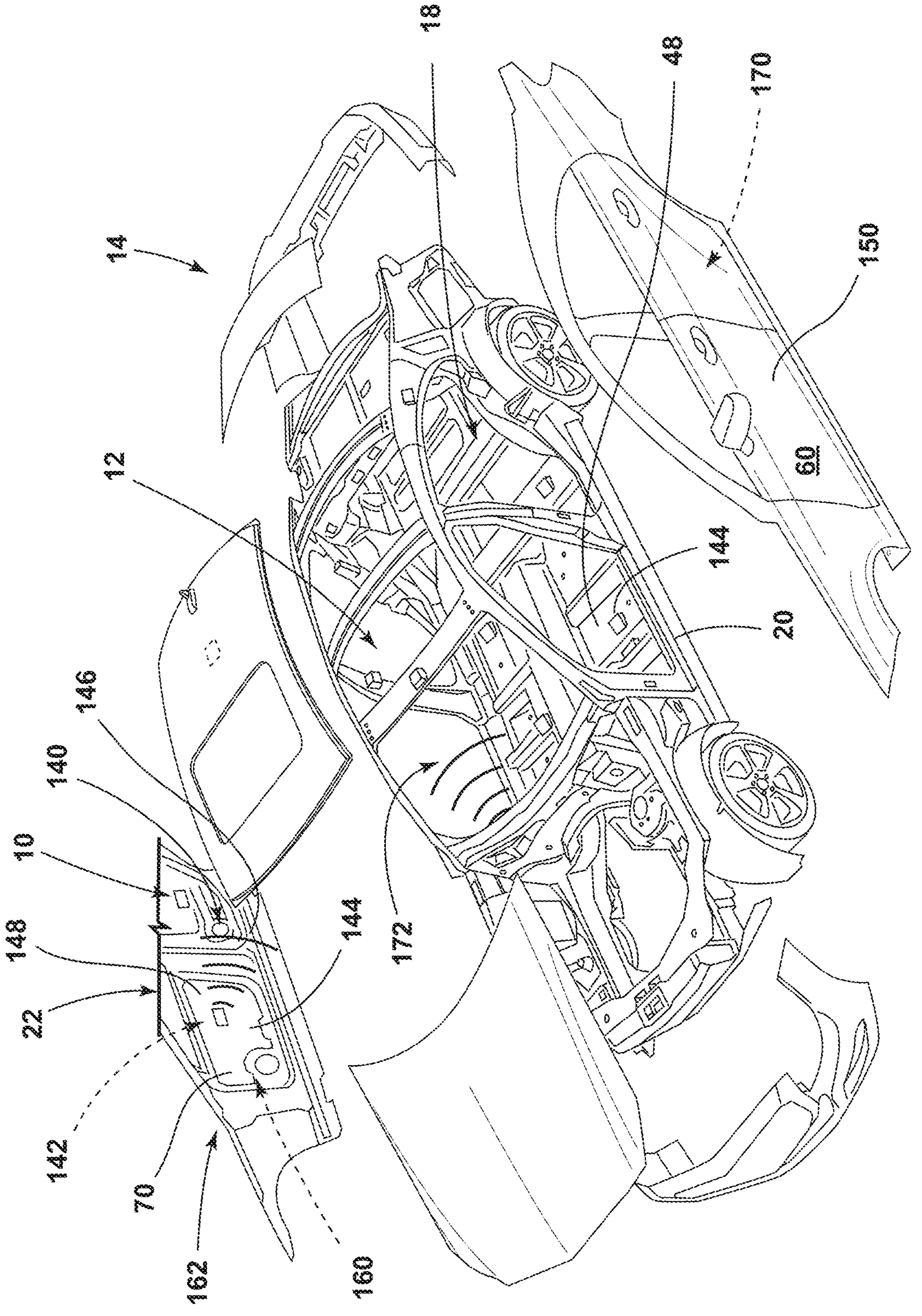
FIG. 8 is an exploded perspective view of a vehicle body and frame and showing exemplary locations of force generators that can be used to produce an aspect of the auditory signal.
Figure 9:
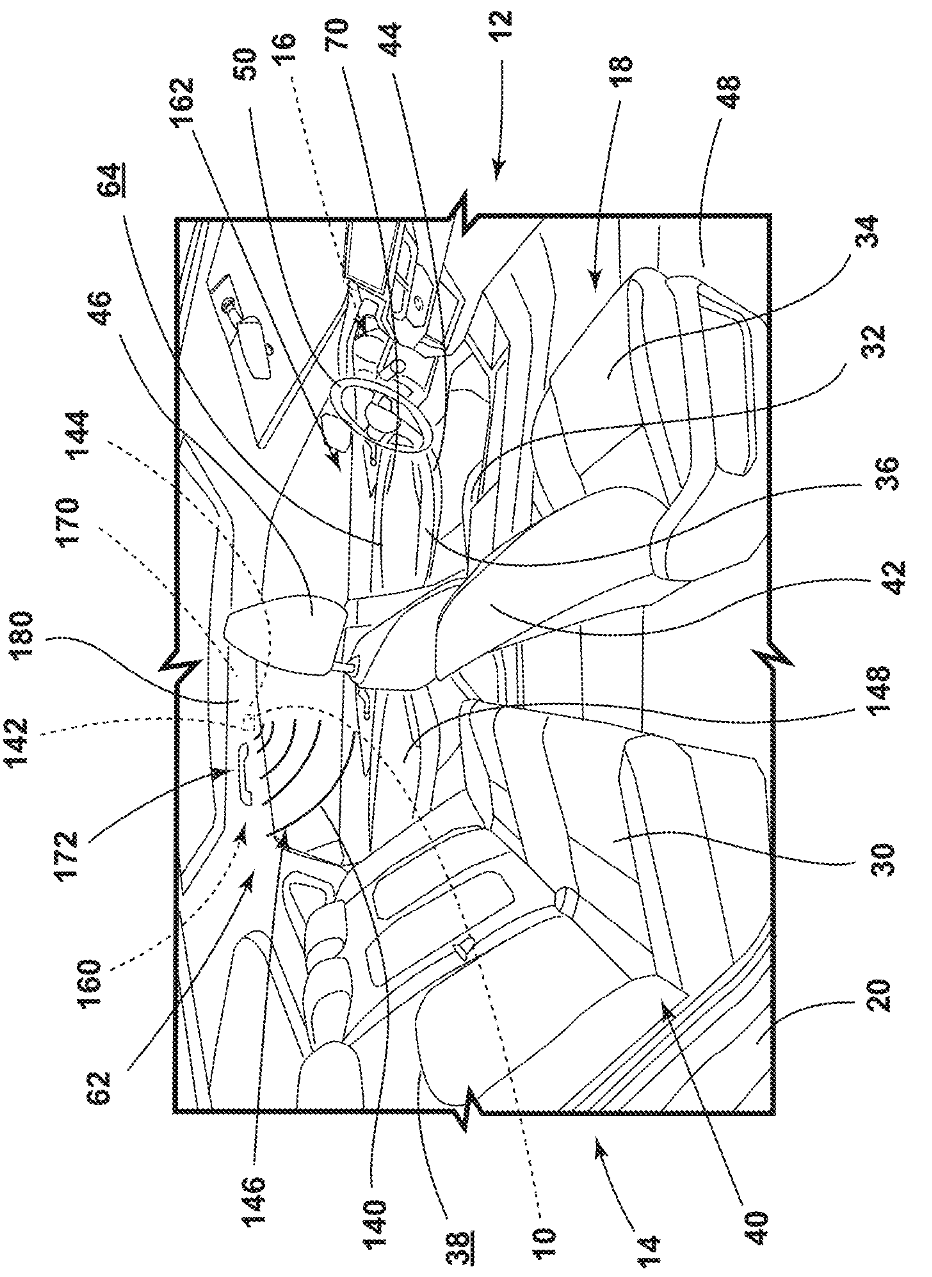
FIG. 9 is an interior perspective view of a passenger cabin for a vehicle and showing aspects of the auditory components of the signaling system.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a three-dimensional signaling system that utilizes a plurality of force generators to provide a haptic signal to the operator and other passengers about a condition relating to the vehicle and a direction from which the condition originates. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As exemplified in FIGS. 1-6, reference numeral 10 generally refers to a force generator that is incorporated within a three-dimensional signaling system 12 incorporated within a vehicle 14. This three-dimensional signaling system 12 provides haptic signals 52 or haptic output to the various occupants of the vehicle 14 regarding information related to a particular condition or aspect of the vehicle 14 or the environment surrounding the vehicle 14. This three-dimensional signaling system 12 utilizes a plurality of force generators 10 that are spaced throughout a passenger cabin 18 of the vehicle 14. According to various aspects of the device, the vehicle 14 includes a frame 20 and a body 22 that is coupled with the frame 20 to define the passenger cabin 18 therein. The frame 20 and the body 22 can be separate components that are attached together or can be a single and integral unibody component where the frame 20 and the body 22 are integrally formed as a single component. The frame 20 and the body 22 can also be a combination of body 22 components that are attached to a unibody component that includes integral frame 20 and body 22 sections.

Referring again to FIGS. 1-6, the body 22 includes a plurality of interior sensors 24 and exterior sensors 26 that are connected with a controller 28 for the vehicle 14. The passenger cabin 18 includes a plurality of seating positions 30. The seating positions 30 can include an operator seat 32 and various passenger seats 34 located throughout the passenger cabin 18. Each seating position 30 includes a plurality of occupant touch points 36. These touch points 36 typically include areas where the occupant of the vehicle 14 physically engages, at least temporarily, a portion of the interior surfaces 38 of the vehicle 14. These occupant touch points 36 can include the seat 40, seat back 42, armrest 44 and head rest 46 of each seating position 30, the floor 48, the steering wheel 50 and other areas where occupants of the vehicle 14 physically engage portions of the interior surface 38 of the passenger cabin 18 for the vehicle 14. A plurality of force generators 10 are positioned or otherwise disposed proximate the occupant touch points 36. These force generators 10 selectively operate to produce a haptic signal 52 or haptic output that can be experienced by one or more of the occupants of the vehicle 14. The controller 28 is in communication with the plurality of interior and exterior sensors 24, 26 as well as the plurality of force generators 10. The controller 28 selectively operates one or more force generators 10 of the plurality of force generators 10 in response to a sensed feedback from at least one sensor of the plurality of interior and exterior sensors 24, 26.

According to the various aspects of the device, the plurality of interior sensors 24 are in communication with the passenger cabin 18. The plurality of exterior sensors 26 are in communication with an outward-facing surface 60 of the body 22 that forms the outer surface of the vehicle 14. The plurality of exterior sensors 26 are in communication with an area immediately surrounding the outward-facing surface 60 of the body 22. In this manner, the plurality of exterior sensors 26 can determine the relative location of objects and obstructions that are within a certain distance of the vehicle 14, as described herein.

In various aspects of the device, certain occupant touch points 36 can include a plurality of dedicated force generators 10. Typically, where an occupant has more consistent contact with a surface of the vehicle 14, such as on the seat 40 and the seat back 42, a greater number of force generators 10 will be positioned for providing greater definition as to the intended direction of the haptic signal 52. These force generators 10 can be attached within the respective touch points 36 or can be attached within a position proximate or near the respective touch points 36. Additionally, the force generators 10 can be attached to the same structure that defines the touch point 36, such as the armrest 44, or a portion of the seating position 30. The force generators 10 can also be attached to a more structurally sturdy substrate such as the frame 20 or body 22, or unibody, of the vehicle 14.

Referring again to FIGS. 1-7, the force generators 10 utilized within the three-dimensional signaling system 12 can include, but are not limited to, circular force generators 90, linear force generators 130, lateral force generators, vertical force generators, and other similar directional force generators that can be used to produce the haptic signals 52 experienced by the occupants of the vehicle 14. Non-limiting examples of these force generators 10 are illustrated in FIGS. 2-7(*c*) These occupants include the operator and passengers of the various seating positions 30 within the passenger cabin 18 of the vehicle 14.

According to the various aspects of the device, the plurality of force generators 10 can be positioned within the body 22, or unibody, of the vehicle 14 and near the various occupant touch points 36. The force generators 10 can also be placed within cushions and bolsters of the various seating positions 30. When any one of the interior sensors 24 or the exterior sensors 26 senses a condition of the vehicle 14 that requires a signal, such as an alert, communication, feedback, or other signal provided to one of the occupants, the exterior sensor 26 communicates the condition to the controller 28. The controller 28 then communicates with one or more of the force generators 10 within a corresponding occupant touch point 36. In addition to the sensors 24, the force generators 10 can also be activated, deactivated or generally operated through one or more dedicated signals, commands or operations of the vehicle 14. By way of example and not limitation, use of a turn signal for the vehicle 14 can activate one or more force generators 10 that provide a haptic signal 52 to the operator that the turn signal has been activated.

According to the various aspects of the device, the location of force generators 10, and the types of force generators 10 to be used within certain portions of the vehicle 14 can vary depending on various factors. These factors can include, but are not limited to, the loudness of the force generator 10, the size available for the force generator 10, whether a haptic signal 52, an auditory signal 146 or both are desired from a particular location, the frequency and/or amplitude of signal desired, whether multiple harmonics are desired from a particular location, a combination of these factors as well as other similar factors that relate to the operating characteristics of the various types of force generators 10.

By way of example and not limitation, one aspect of the device may include force generators 10 within a seat 32 of the vehicle 14. In certain instances, the force generators 10 in the seat 14 can be linearly operating force generators 10, or LFG's. These LFG's can be quieter during operation such that the use of LFG's may be appropriate within a seat 32 so that the occupant is less likely to hear the operation of the force generator 10. In this manner, the occupant is able to appreciate the auditory signal 146 and/or the haptic signal 52 produced by the force generator 10, rather than the sound of the force generator 10 itself.

Referring again to FIGS. 1-6, the three-dimensional signaling system 12 is used to activate force generators 10 within occupant touch points 36 that correspond to a direction, relative to the occupant, from which the signal originates. By way of example, and not limitation, where an operator's side door 70 is ajar, a force generator 10 within an occupant touch point 36 of the armrest 44 for the operator seat 32 or the left side of the seat 40 may activate to alert the operator that the door 70 to their left is not fully closed. Accordingly, the force generator 10 to the operator's left operates to alert the operator regarding a condition to the left of the operator.

According to the various aspects of the device, frequencies of vibrations 142 that are produced by the force generators 10 can vary. It has been shown that changes in frequency can be used to accentuate or dampen a directional component 62 of these vibrations 142. Stated another way, where a force generator 10 produces a higher frequency haptic signal 52, an occupant of the vehicle 14 is better able to determine where the vibrations 142 of the haptic signal 52 originate from within the vehicle 14. Conversely, lower frequency haptic signals 52 that are produced by force generators 10 are perceived as more ubiquitous in nature such that it is less likely that an occupant will be able to determine where the lower frequency vibration 142 originated. Using these changes in frequency and use of different frequencies in combination, the three-dimensional signaling system 12 can be utilized to produce a wide range of experiential haptic signals 52 that can be directional, ubiquitous, or can include different frequency components that include ranges of frequencies that are produced by the force generators 10. Using this configuration, where the haptic signal 52 requires a directional component 62, the force generators 10 will typically produce a higher frequency vibration 142 so that the point of origination of the haptic signal 52 is more easily perceived. Conversely, where a haptic signal 52 does not require a directional component 62, lower frequencies can be produced by the various force generators 10.

According to the various aspects of the device, certain tests have shown that within certain situations, certain types of force generators 10 can effectively produce certain frequencies of the auditory signals 146. By way of example and not limitation, tests have shown that circular force generators 10, or CFG's, can effectively produce low frequency and medium frequency auditory signals 146. Additionally, tests have shown that linear force generators 10, or LFG's, can effectively produce medium frequency and higher frequency auditory signals 146. Additionally, in certain aspects of the device, the haptic signals 52 can be effectively produced, typically, by the LFG's. Tests have also shown that haptic signals 52 that are in the form of a globally perceived vibration that can be distributed throughout the passenger cabin 18 and the vehicle 14 can effectively be produced by the CFG's.

Similarly, where an operator is attempting to change lanes on a roadway, the three-dimensional signaling system 12 can provide a haptic signal 52 to the operator about the presence of an obstruction, such as another vehicle 14 in a blind spot 80 of the vehicle 14. Accordingly, where the operator is attempting to change lanes to the right, the presence of a vehicle 14 in a blind spot 80 to the right side of the vehicle 14 can be sensed by one of the exterior sensors 26. These exterior sensors 26 can communicate with the controller 28 regarding the condition within the blind spot 80 of the vehicle 14. The controller 28 can then alert the driver through activating force generators 10 on the right side of the steering wheel 50, on the right side of the operator seat 32, such as the seat 40, seat back 42 or head rest 46. Using these force generators 10 in combination, the three-dimensional signaling system 12 alerts the operator to the presence of a condition to the right of a vehicle 14 and in the operator's blind spot 80.

In certain aspects of the device, certain seating positions 30 with in the vehicle 14 can include a plurality of force generators 10 for alerting an occupant, typically the driver, about the presence of an object near the vehicle 14. Using the exterior sensors 26, the presence of the object can be communicated to the driver through a set of sequenced and varying activations. These activations can be coordinated to produce a three-dimensional haptic signal 52 that is received by the driver through the driver's engagement with the touch points 36 of the seat 40 and the steering wheel 50. In this manner, the force generators 10 produce a haptic signal 52 that has a directional component 62 as well as a temporal component that can communicate the relative position of the object, with respect to the vehicle 14, over time. This directional component 62, according to various aspects of the device, can be created by the plurality of force generators 10 being operated by the controller 28 in a coordinated fashion. This coordinated operation of the force generators 10 can produce a directional component 62 of the haptic signal 52 and/or the auditory signal 146 that is delivered through a timed sequential path 190 through the passenger cabin 18. This timed sequential path 190 can be linear, radial, convergent, divergent, as well as other directional configurations. In various aspects of the device, the auditory signal 144 can be produced by a first plurality of force generators 10. It is also contemplated that the haptic signal 52 can be produced by a second plurality of force generators 10. It is further contemplated that the haptic signals 52 and the auditory signals 144 can be produced by common force generators 10 by modifying the amplitude, frequency, or other variable characteristic of one or more force generators 10.

In at least one aspect of the device, the force generators 10 can be activated such that the force generators 10 nearest to the object provide a greater feedback than those force generators 10 that are farther from the object. As the object gets closer or farther from the vehicle 14, or changes position with respect to the vehicle 14, as detected by the exterior sensors 26, the force generators 10 can change the character of the vibration produced. This change in vibration can be in the form of a change in the frequency of the activations, the amplitude of the activation, the number of activations and deactivations that may occur over time, and other changes in vibration. As the relative position of the object move toward the front of the vehicle 14, the three-dimensional haptic signal 52 produced by the force generators 10 will increase in the force generators 10 positioned near the front of the seat 40. Additionally, the force generators 10 can be selectively operated by the controller 28 to provide an adjustable amplitude, and adjustable frequency and/or and adjustable duration that can be modified, modulated or otherwise changed to provide a desired haptic signal 52 and/or a desired auditory signal 146.

By way of example and not limitation, the seat 40 may include four force generators 10 and the steering wheel 50 may include a series of force generators 10. These force generators 10 can activate in a coordinated fashion to provide a heightened vibration in the direction of the object. This haptic signal 52 is communicated to the driver about the presence of an object, such as another vehicle 14 in a blind spot 80. As the position of the object changes with respect to the vehicle 14, as sensed by the exterior sensors 26, the character of the haptic signal 52 produced by these force generators 10 changes, as described herein. Accordingly, the force generators 10 produce a three-dimensional haptic signal 52 that is communicated to the driver regarding the status, and change in status, of the object. In this manner, the haptic signal 52 can be a communication prompt related to a driver's side of the vehicle 14. The timed sequential path 190 of the haptic signal 52 and/or auditory signal 146 is directed to a driver's side of the vehicle 14. Typically, the generation of this directional signal is in response to the plurality of exterior sensors 26 sensing a separate vehicle 14 positioned adjacent to an exterior surface of the driver's side of the vehicle 14.

According to various aspects of the device, as exemplified in FIG. 1, the various occupant touch points 36 can be activated and deactivated depending upon whether an occupant of the vehicle 14 is physically engaging the respective occupant touch point 36. Various touch surfaces, weight sensors, and other sensors can be utilized for indicating whether the body part of an occupant is physically engaging one of the occupant touch points 36. When such interaction occurs, the occupant touch point 36 and the force generator 10 associated with that occupant touch point 36 can be placed in a ready state to provide a haptic signal 52. When the body part of the occupant is removed from the corresponding occupant touch point 36, that occupant touch point 36 can be deactivated as being in an idle state and not able to communicate a haptic signal 52. Similarly, various sensors within the steering wheel 50 can be activated and deactivated based upon where the operator engages the steering wheel 50. Accordingly, the three-dimensional signaling system 12 can include a continually changing set of active touch points 36 of the plurality of occupant touch points 36 based upon which seating positions 30 are occupied and which portions of the vehicle 14 the various occupants are physically engaging. In addition, the occupant touch points 36 can include certain portions of the passenger-cabin facing surfaces 64 that are positioned adjacent to at least one seating position 30 of the plurality of seating positions 30 within the passenger cabin 18.

The various signals produced by the force generators 10 can vary in pattern, magnitude, intensity and duration. By way of example, and not limitation, an alert related to the roadway or an obstruction located in close proximity to the vehicle 14 can be communicated to the operator or other passengers of the vehicle 14 as a set of intermittent vibrations that are communicated to the operator or other passengers. This intermittent vibration can be indicative of or similar to a vehicle 14 driving over rumble strips that are defined within a surface of the roadway and along the shoulder. It is also contemplated that the intensity of the vibrations can increase depending upon the proximity of the obstruction or condition to the outside of the vehicle 14. Accordingly, as a vehicle 14 moves closer to the obstruction or the edge of the roadway, the intensity of the vibrations produced by the three-dimensional signaling system 12 can become greater over time. Conversely, as the obstruction and the vehicle 14 move away from one another, the intensity of the vibrations or haptic signals 52 can diminish.

It is contemplated that the variation in the haptic signal 52 produced by the various force generators 10 can be predetermined and incorporated within the controller 28 or micro-controller 110. In this aspect of the device, certain haptic signals 52 are provided in response to a set input. It is also contemplated that the variation in the haptic signal 52 can be monitored by feedback sensors. These feedback sensors can detect the character of the haptic signal 52 generated by the force generator 10. Where the haptic signal 52 is inconsistent with a desired haptic output, the feedback sensor can communicate this inconsistency to the controller 28 or micro-controller 110 to, in turn, adjust the operation of the force generator 10 to match the desired haptic output of the haptic signal 52.

According to various aspects of the device, the three-dimensional signaling system 12 can be utilized as a haptic communications device among the occupants. Where one occupant desires to gain the attention of another occupant, a signal can be provided to an occupant regarding the direction of the person attempting to communicate. In this manner, the haptic signal 52 and/or the auditory signal 146 can be a communication prompt related to an originating seating position 30 of the plurality of seating positions 30, and wherein the timed sequential path 190 is directed to the originating seating position 30.

By way of example, and not limitation, where a front passenger attempts to alert a rear passenger that their attention is required, the three-dimensional signaling system 12 can activate force generators 10 toward the front of the seating position 30. This activation of the three-dimensional signaling system 12 provides a signal that a passenger to the front of the passenger cabin 18 is attempting to gain their attention. This can be useful where driving conditions are particularly noisy or one of the passengers is utilizing entertainment functions and may not be able to hear the other occupants. The three dimensional signaling system 12 can also be used to provide entertainment functions where the various force generators 10 can intensify certain sequences of a movie, video game, music, or other entertainment experience.

Referring now to FIGS. 2-6, the force generator 10 can be in the form of a circular force generator 90. Where a circular force generator 90 is used, the circular force generator 90 includes a first rotor 92 having a first eccentric body 94 and a second rotor 96 having a second eccentric body 98. A central shaft 100 extends between the first and second rotors 92, 96 that are rotationally operable about a common rotational axis 102 with respect to one another. This rotational operation can be used to position the first and second eccentric bodies 94, 98 with respect to one another. This movement of the first and second eccentric bodies 94, 98 can define a balanced position 104 and any one of a plurality of eccentric positions 106. The various eccentric positions 106 can be used for modifying the intensity of the haptic signal 52 produced by the various force generators 10. In the balanced position 104, virtually no haptic signal 52 is provided. As the first and second eccentric bodies 94, 98 move about the rotational axis 102 with respect to one another, the haptic signal 52 can be modified or modulated. A stator assembly 108 is in electromagnetic communication with the first and second rotors 92, 96. A micro-controller 110 can be incorporated within the force generator 10 for providing an electrical current to the stator assembly 108 to regulate the rotational speed of the first and second rotors 92, 96 as well as the relative positions of the first and second eccentric bodies 94, 98 with respect to one another.

According to various aspects of the device, the three-dimensional signaling system 12 provides global and directional vibration that can produce a low frequency vibration 142 as well as a low frequency sound 172 to the various occupants of the vehicle 14. The various tactile signals 16 can be in the form of alerts to the occupants related to a condition within or around the vehicle 14. As discussed herein, the various force generators 10 provide global vibration response throughout the passenger cabin 18 of the vehicle 14 by using the various occupant touch points 36. The frequency of vibrations and intensity of vibrations produced by the various force generators 10 can be customized through various mapping topologies throughout the vehicle 14. Accordingly, various intensities of vibrations may be greater in areas where the alert originates, and lesser in other areas of the passenger cabin 18. Additionally, the various force generators 10 can be used in a sequential and mapping function to vibrate in a particular sequence and haptic direction 120 to direct the occupant's attention to a particular portion of the vehicle 14. Accordingly, where a signal is directed toward the front right 124 of the vehicle 14, the various force generators 10 can activate in varying intensity from the rear left 122 and toward the front right 124. This directional mapping of vibrations is used to direct the various occupants' attention to a particular portion of a vehicle 14 or area around the vehicle 14. Typically, where only the operator is to be alerted through the haptic signal 52, the haptic direction 120 can be experienced within the operator seat 32.

Through the various configurations described herein, each seating positions 30 of the vehicle 14 and the occupant touch points 36 incorporated therein can be fitted with force generators 10. These force generators 10 can be activated and deactivated in various combinations and permutations to direct the attention of an occupant to a particular portion of a vehicle 14. Additionally, the three-dimensional signaling system 12 can create unique and customizable vehicle signatures that can be indicative of various conditions present within and around the vehicle 14.

The various haptic signals 52, as described herein, produced by the three-dimensional signaling system 12 can include lane departure signals, operator warning signals, exterior proximity signals, intra-passenger communications, entertainment signals, combinations thereof, and other similar haptic signals 52 and alerts. Typically, the haptic signals 52 provided to an operator are related to vehicle conditions, while haptic signals 52 provided to passengers other than the operator may be more entertainment related or related to intra-passenger communication.

According to various aspects of the device, the three-dimensional signaling system 12 can be utilized within electric vehicles 14 that are powered primarily or exclusively by an electrical power system for producing certain experiential vibrations. Because the electric vehicles 14 produce little noise or vibration while operating, the use of the three-dimensional signaling system 12 can be useful in providing informational and experiential haptic signals 52 related to the vehicle 14. The three-dimensional signaling system 12 can also be used in hybrid vehicles 14 that include a combustion engine that supplements the electrical power system. The three-dimensional signaling system 12 can also be used in conventional combustion-engine vehicles 14.

According to the various aspects of the device, the three-dimensional signaling system 12 provides a system of haptic signals 52 to the various occupants that can be used to direct the user's attention toward a particular direction of the vehicle 14. Accordingly, occupants of the vehicle 14 can be directed to a portion of the vehicle 14 requiring attention without the need for looking at a heads-up display or other portion of the console for determining where a particular condition is occurring. The intuitive functionality of the three-dimensional signaling system 12 can provide an immediate informational feedback to the operator of the vehicle 14 for knowing where a particular condition is occurring.

Referring now to FIGS. 1-9, the signaling system 12 for the vehicle 14 can include auditory signals 146 in the form of an auditory alert 140 or a plurality of auditory alerts 140 that can be perceived from one or more seating positions 30 of the vehicle 14. These auditory alerts 140 can be produced using one or more force generators 10 that operate to produce a high frequency vibration 142. This vibration 142 acts upon a resonating substrate 144. The combination of the vibration 142 and the resonating substrate 144 can be used to produce an auditory alert 140, or other auditory signal 146 that can be perceived throughout the passenger cabin 18 of the vehicle 14. As described herein, the location of the force generators 10 can be positioned or otherwise disposed to produce one or more auditory signals 146 that can be positioned to originate from various locations of the passenger cabin 18. It is contemplated that various components of the frame 20, interior panels 148, exterior panels 150, and other surfaces of the vehicle 14 can be utilized as the resonating substrate 144.

Referring again to FIGS. 1, 8 and 9, in certain aspects of the device, the force generators 10 can be attached to the frame 20 of the vehicle 14 or to various interior and/or exterior panels 148, 150 of the vehicle 14. When positioned on certain body panels 162, the force generators 10 can be positioned within an interior cavity 160 positioned within the frame 20 for the vehicle 14. In addition to vibrating against the one or more resonating substrates 144, the interior cavity 160 within the frame 20 for the vehicle 14 can be used as an amplification chamber to accentuate the auditory signal 146. These interior cavities 160 can be located within a door 70 of the vehicle 14, various body panels 162 for the vehicle 14, within certain components of the frame 20 for the vehicle 14, within seats 40, within armrests 44, and other locations within and around the passenger cabin 18 for the vehicle 14.

Referring again to FIGS. 1-9, the force generators 10 can be utilized throughout the vehicle 14 to produce certain frequencies of vibrations 142. Where the signaling system 12 is intended to produce a tactile signal 16, the force generator 10 can produce a lower frequency vibration 142 having a frequency of from approximately 20 Hz to approximately 100 Hz. Where the signaling system 12 is intended to produce an auditory signal 146, the force generator 10 can operate at a higher frequency that is greater than approximately 50 Hz and typically greater than approximately 100 Hz. Within these higher range frequencies, the vibrations 142 become more difficult to detect in a tactile sense. These higher frequency vibrations 142 are more able to be sensed in an auditory perspective. This is particularly true when these vibrations 142 act upon the resonating substrate 144 within the vehicle 14.

Referring again to FIGS. 1-9, where the signaling system 12 is intended to produce the tactile signal 16 or the haptic signal 52, the force generator 10 can be larger such that a greater amplitude of vibration 142 can be produced and also sensed by the occupants of the vehicle 14. In order to achieve the higher frequency vibrations 142 needed to produce the auditory signal 146, the force generators 10 are typically smaller in size. These smaller force generators 10 can operate to produce more rapid and higher frequency vibrations 142. These higher frequency vibrations 142 are able to act upon one of the resonating substrates 144 to produce the auditory signal 146.

It is contemplated that the force generators 10 placed throughout the vehicle 14 for producing the auditory signals 146 can be tuned or otherwise configured to accommodate the various naturally occurring harmonics 170 of the resonating substrates 144 to which the force generators 10 are attached. Accordingly, a force generator 10 that is attached to a resonating substrate 144 made of steel may have a different operating frequency than a force generator 10 that is attached to a resonating substrate 144 made of aluminum. Also, where the resonating substrate 144 is made of any other material, such as plastic, composite, ceramic, or other similar material, the force generator 10 can be tuned to take advantage of the various inherent harmonics 170 related to the material for each particular resonating substrate 144.

It is also contemplated that certain materials can be utilized as a resonating substrate 144 that may produce different auditory signals 146 based upon the frequency of vibration 142 produced by the force generator 10. Accordingly, certain resonating substrates 144 may produce a lower frequency tone or lower pitched sound 172 where the force generator 10 creates a lower frequency vibration 142. Where a higher frequency vibration 142 is produced by the force generator 10, the resonating substrate 144 may produce a higher frequency tone or higher pitched sound 172 for the auditory signal 146.

Using the force generators 10 in combination with the resonating substrates 144, or at least one resonating substrate 144 (typically a plurality of resonating substrates 144), a system of auditory signals 146 or auditory feedback can be produced by the signaling system 12 for the vehicle 14. These auditory alerts 140 and auditory signals 146 can be used to provide the user with indicators regarding the status of the vehicle 14, certain information regarding the vehicle 14 or the passenger cabin 18, and other similar signals.

By way of example, and not limitation, where the task light 180 for a particular seating position 30 within the vehicle 14 is left on for an extended period of time, a force generator 10 can operate to produce a vibration 142 against a resonating substrate 144 that is positioned near the task light 180. This operation of the force generator 10 can produce the auditory signal 146 having a particular frequency or tone that can alert one or more occupants regarding the status of the task light 180.

According to various aspects of the device, where an electrically-powered vehicle 14 is fitted with the signaling system 12, it is contemplated that the signaling system 12 can be utilized for reproducing certain sounds 172 that are typically experienced by vehicles 14 with combustion engines, but not typically experienced within electric vehicles 14. For example, the sound 172 of a combustion engine can be reproduced using one or more force generators 10 and one or more resonating substrates 144. Such a sound 172 can be generated from the frunk (front truck) area of the electric vehicle 14 to provide the experience of having an engine at the front of the vehicle, or other portion of the vehicle 14. Additionally, the sound 172 of one vehicle 14 approaching from behind or nearing from the front of the vehicle 14, may be reproduced as a "whoosh" using the signaling system 12. Reproduction of these signals can be utilized to provide an operator with certain auditory feedback relating to the passenger cabin 18, the vehicle 14 and/or the environment surrounding the vehicle 14. In the case of more complex sounds 172, like the sound of a combustion engine, multiple force generators 10 and multiple resonating substrates 144 can be used, in combination, to produce more sophisticated or multi-tonal sounds. The force generators 10 can be positioned within a frunk of an electric vehicle 14 as well as within any of the storage areas that may be present within the electric vehicle 14.

According to various aspects of the device, the force generators 10 can be attached to a resonating substrate 144 that is incorporated within a portion of the frame 20 for the vehicle 14. It is also contemplated that dedicated resonating substrates 144 of a particular material having a particularly responsive resonating characteristic can be placed within the vehicle 14. These dedicated resonating materials can be utilized for providing particular auditory alerts 140 and auditory signals 146 to the occupants of the vehicle 14. It is also contemplated that certain force generators 10 can be operable relative to a resonating substrate 144 to take advantage of various harmonic characteristics that correspond to particular locations within the resonating substrate 144.

As discussed herein, the force generators 10 that produce the tactile signals 16, the haptic signals 52 and the auditory signals 146 can be placed throughout the vehicle 14, as discussed herein.

It is also contemplated that the auditory signals 146 can be used in combination with various haptic signals 52 and tactile signals 16 to produce a range of experiential events for the various occupants of the vehicle 14. Variations in volume, intensity and direction can also be used to highlight certain experiential features within the passenger cabin 18 of the vehicle 14.

As an additional and non-limiting example of the device, the signaling system 12 can locate linear force generators 10, or LFG's within or near the passenger cabin 18 and within the occupant touch points 36. Typically, LFG's have a quieter operating sound such that the haptic signal 52 and/or the auditory signal 146 produced can be received without also hearing the operation of the force generator 10 itself. Conversely, other types of force generators 10, such as circular force generators, or CFG's, can be positioned within the frame 20, body panels 162, or unibody of the vehicle 14 to produce certain auditory signals 146 and/or haptic signals 52.

According to the various aspects of the device, the haptic signals 52 can be produced by a combination of types of force generators 10. By way of example, and not limitation, expansive and more ubiquitous haptic signals 52 that may have a lower frequency can be generated through the use of CFG's or force generators 10 that operate through a circular motion. Also, haptic signals 52 that have a higher frequency or that may require a smaller force to be perceived, such as with an occupant touch point 36, using LFG's or force generators 10 that operate through a linear motion. In general, the haptic signals 52 and the auditory signals 146 can be operated through a signal force generator 10, or through a combination of force generators 10 that can operate in a cooperative fashion to produce a multi-frequency haptic signal 52 and/or auditory signal 146. In this manner, various harmonics and sounds that include a diverse auditory spectrum can be used by the signaling system 12 for enhancing the experience of the occupant within the passenger cabin 18 of the vehicle 14.

According to the various aspects of the device, a vehicle 14 can be switched between certain modes of operation. Such modes can include an off-road mode, a high-performance mode, a winter mode, an economic mode, and other similar modes of operation. It is contemplated that the signaling system 12 can be used in conjunction with these modes to produce different haptic signals 52 and auditory signals 146 that cooperate with the modes of operation to produce unique feedback to the occupants of the vehicle 14 based upon the selected mode. By way of example, and not limitation, an off-road mode setting may be combined with certain haptic signals 52 that are directed through the entire vehicle 14 to provide the sensation of going over rough terrain. Again, it is contemplated that each mode of operation can be paired with a unique set of haptic signals 52 and auditory signals 146 that may be indicative of that particular mode of operation. It is also contemplated that each mode of operation can include a customizable set of haptic signals 52 and auditory signals 146 that a user may designate as being indicative of that particular mode of operation.

According to various aspects of the device, the auditory signals 146 can also be projected as an auditory alert 140 to areas outside of the vehicle. By way of example, and not limitation, certain force generators 10 can be situated near the outside of the vehicle 14 for producing auditory signals 146 that can be heard by pedestrians surrounding the vehicle 14. If the exterior sensors sense that a pedestrian is near the vehicle 14, the force generators 10 can produce an auditory alert 140 for letting the pedestrian know that a vehicle 12 is approaching. In this manner, the force generators 10 can be utilized as proximity warnings for pedestrians surrounding a vehicle 14 to be aware of the presence of the vehicle 14.

The invention disclosed herein is further summarized in the following paragraphs and is further characterized by combinations of any and all of the various aspects described therein.

According to one aspect of the present disclosure, a vehicle includes a frame. A body is coupled with the frame and defines a passenger cabin therein. The body has a plurality of interior sensors and a plurality of exterior sensors. A plurality of seating positions are within the passenger cabin. Each seating position has a plurality of occupant touch points. A plurality of force generators are positioned proximate the occupant touch points. A controller is in communication with the plurality of interior sensors, the plurality of exterior sensors and the plurality of force generators. The controller operates the plurality of force generators in response to sensed feedback from at least one sensor of the plurality of interior sensors and the plurality of exterior sensors.

According to another aspect, the vehicle further comprises an electrical power system.

According to another aspect, the plurality of force generators are disposed on one of the frame, the body, and the plurality of seating positions.

According to another aspect, the frame and the body include resonating substrates, and the plurality of force generators are attached to the resonating substrates.

According to another aspect, the plurality of force generators are circular force generators.

According to another aspect, the plurality of force generators are configured to selectively operate to produce a three-dimensional haptic signal relative to the plurality of seating positions.

According to another aspect, the plurality of force generators are configured to produce a haptic output that is operated by the controller.

According to another aspect, the haptic output includes an adjustable amplitude, an adjustable frequency, and an adjustable duration that are operated by the controller.

According to another aspect, the plurality of force generators are operated by the controller in a coordinated fashion to produce a directional component of a three-dimensional haptic signal that is delivered through a timed sequential path through the passenger cabin.

According to another aspect, the haptic signal is a communication prompt related to an originating seating position of the plurality of seating positions, and the timed sequential path is directed to the originating seating position.

According to another aspect, the three-dimensional haptic signal is a communication prompt related to a driver's side of the vehicle, and the timed sequential path is directed to a driver's side of the vehicle in response to the plurality of exterior sensors sensing a separate vehicle positioned adjacent to an exterior surface of the driver's side of the vehicle.

According to another aspect, the electrical power system is an exclusive power source.

According to another aspect, the occupant touch points include passenger-cabin facing surfaces that are positioned adjacent to at least one seating position of the plurality of seating positions.

According to another aspect, the plurality of interior sensors are in communication with the passenger cabin.

According to another aspect, the plurality of exterior sensors are in communication with an outward-facing surface of the body that is outside the passenger cabin and in communication with an area immediately surrounding the outward-facing surface of the body.

According to another aspect of the present disclosure, an electrically-powered vehicle includes a frame. A body is coupled with the frame and defines a passenger cabin therein. The body has a plurality of interior sensors and a plurality of exterior sensors. The body and the frame incorporate a plurality of resonating substrates. A plurality of seating positions are within the passenger cabin. Each seating position is located adjacent to at least one resonating substrate of the plurality of resonating substrates. A plurality of force generators are positioned in communication with the plurality of resonating substrates, respectively. A controller is in communication with the plurality of interior sensors, the plurality of exterior sensors and the plurality of force generators. The controller operates the plurality of force generators to act on at least one of the plurality of resonating substrates in response to sensed feedback from at least one sensor of the pluralities of interior sensors and exterior sensors.

According to another aspect, the plurality of force generators are disposed proximate at least one of the frame, the body, and the plurality of seating positions.

According to another aspect, the plurality of force generators include at least one of circular force generators and linear force generators.

According to another aspect, the plurality of force generators are configured to selectively operate to produce a three-dimensional haptic signal relative to the plurality of seating positions.

According to another aspect, the plurality of force generators are configured to produce a haptic output that is operated by the controller.

According to another aspect, the plurality of force generators are operated by the controller in a coordinated fashion to produce a directional component of a three-dimensional haptic signal that is delivered through a timed sequential path through the passenger cabin.

According to another aspect, the three-dimensional haptic signal is a communication prompt related to an originating seating position of the plurality of seating positions, and the timed sequential path is directed to the originating seating position.

According to another aspect, the three-dimensional haptic signal is a communication prompt related to a driver's side of the vehicle, and the timed sequential path is directed to a driver's side of the vehicle in response to the plurality of exterior sensors sensing a separate vehicle positioned adjacent to an exterior surface of the driver's side of the vehicle.

According to another aspect, the electrically-powered vehicle further comprises a combination engine that supplements an electrical power system.

According to another aspect, occupant touch points include passenger-cabin facing surfaces that are positioned adjacent to at least one seating position of the plurality of seating positions.

According to another aspect, the plurality of interior sensors are in communication with the passenger cabin, and the plurality of exterior sensors are in communication with an outward-facing surface of the body that is outside the passenger cabin and in communication with an area immediately surrounding the outward-facing surface of the body.

According to another aspect of the present disclosure, a vehicle includes a frame. A body is coupled with the frame and defines a passenger cabin therein. The body has a plurality of interior sensors and a plurality of exterior sensors. A plurality of resonating substrates are incorporated into at least one of the frame and the body. A plurality of seating positions are within a passenger cabin. Each seating position has a plurality of occupant touch points. A first plurality of force generators are positioned proximate the plurality of resonating substrates. The first plurality of force generators are selectively operating on a portion of the plurality of resonating substrates to produce an auditory signal. A second plurality of force generators are positioned proximate the occupant touch points. The second plurality of force generators operate cooperatively with the occupant touch points to produce at least a haptic signal. A controller is in communication with the plurality of interior sensors, the plurality of exterior sensors, the plurality of force generators, and the second plurality of force generators. The controller operates the first plurality and the second plurality of force generators in response to sensed feedback from at least one sensor of the pluralities of interior sensors and exterior sensors to generate a three-dimensional signal that includes the auditory signal and the haptic signal.

According to another aspect, the pluralities of first and second force generators are disposed proximate at least one of the frame, the body, and the plurality of seating positions.

According to another aspect, the pluralities of first and second force generators include at least one of circular force generators and linear force generators.

According to another aspect, the pluralities of first and second force generators are configured to selectively operate to produce a three-dimensional haptic signal relative to the plurality of seating positions.

According to another aspect, the pluralities of first and second force generators are configured to produce the haptic signal that is operated by the controller.

According to another aspect, the haptic signal includes an adjustable amplitude, an adjustable frequency and an adjustable duration.

According to another aspect, the plurality of force generators are operated by the controller in a coordinated fashion to produce a directional component of the haptic signal that is delivered through a timed sequential path through the passenger cabin.

According to another aspect, the haptic signal is a communication prompt related to an originating seating position of the plurality of seating positions, and the timed sequential path is directed to the originating seating position.

According to another aspect, the haptic signal is a communication prompt related to a driver's side of the vehicle, and the timed sequential path is directed to a driver's side of the vehicle in response to the plurality of exterior sensors sensing a separate vehicle positioned adjacent to an exterior surface of the driver's side of the vehicle.

According to another aspect the vehicle further comprises a combustion engine that supplements an electrical power system.

According to another aspect, the occupant touch points include passenger-cabin facing surfaces that are positioned adjacent to at least one seating position of the plurality of seating positions.

According to another aspect, the plurality of interior sensors are in communication with the passenger cabin.

According to another aspect, the plurality of exterior sensors are in communication with an outward-facing surface of the body that is outside the passenger cabin and in communication with an area immediately surrounding the outward-facing-surface of the body.

According to another aspect, the body and the frame are formed as a single integral unibody component.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:

a frame;

a body coupled with the frame and defining a passenger cabin therein, the body having a plurality of interior sensors and a plurality of exterior sensors;

a plurality of seating positions within the passenger cabin, each seating position having a plurality of occupant touch points;

a plurality of force generators positioned proximate the occupant touch points, wherein at least a portion of the plurality of occupant touch points includes multiple force generators of the plurality of force generators; and a controller in communication with the plurality of interior sensors, the plurality of exterior sensors and the plurality of force generators, wherein the controller operates the plurality of force generators in response to sensed feedback from at least one sensor of the plurality of interior sensors and the plurality of exterior sensors, and wherein respective force generators of the plurality of force generators are operated in combination to produce a set of sequenced activations that produces a three-dimensional haptic signal, the three-dimensional haptic signal operating through the respective force generators and the set of sequenced activations to change a source of the three-dimensional haptic signal, wherein the source of the three-dimensional haptic signal is moved along a directional component of the three-dimensional haptic signal and through the respective force generators of at least two respective occupant touch points of the plurality of occupant touch points, the at least two respective occupant touch points being positioned along the directional component.

2. The vehicle of claim 1, wherein the plurality of force generators are disposed on at least one of the frame, the body, and the plurality of seating positions.

3. The vehicle of claim 1, wherein the frame and the body include resonating substrates, and wherein the plurality of force generators are attached to the resonating substrates.

4. The vehicle of claim 1, wherein the plurality of force generators are circular force generators.

5. The vehicle of claim 1, wherein the plurality of force generators are configured to selectively operate to produce the three-dimensional haptic signal relative to the plurality of seating positions.

6. The vehicle of claim 1, wherein the plurality of force generators are configured to produce a haptic output that is operated by the controller, and wherein the haptic output includes an adjustable amplitude, an adjustable frequency and an adjustable duration that are operated by the controller.

7. The vehicle of claim 1, wherein the set of sequenced activations is delivered through a timed sequential path of activations of a portion of the plurality of force generators through the passenger cabin.

8. The vehicle of claim 1, wherein the occupant touch points include passenger-cabin facing surfaces that are positioned adjacent to at least one seating position of the plurality of seating positions.

9. The vehicle of claim 1, wherein the body and the frame are formed as a single integral unibody component.

10. An electrically-powered vehicle comprising:

a frame;

a body coupled with the frame and defining a passenger cabin therein, the body having a plurality of interior sensors and a plurality of exterior sensors, wherein the body and the frame incorporate a plurality of resonating substrates;

a plurality of seating positions within the passenger cabin, each seating position having a plurality of occupant touch points and being located adjacent to at least one resonating substrate of the plurality of resonating substrates;

a plurality of force generators that includes circular force generators that are positioned in communication with the plurality of resonating substrates, respectively, the plurality of force generators also positioned proximate the occupant touch points; and a controller in communication with the plurality of interior sensors, the plurality of exterior sensors and the circular force generators, wherein the controller operates the circular force generators to act on at least one of the plurality of resonating substrates and the plurality of occupant touch points in response to sensed feedback from at least one sensor of the pluralities of interior sensors and exterior sensors, and wherein a portion of the circular force generators and a corresponding portion of the plurality of resonating substrates operate in combination to produce multiple auditory frequencies that are indicative of a multi-tonal sound, and wherein respective force generators of the plurality of force generators are operated in combination to produce a set of sequenced activations that produces a three-dimensional haptic signal, the three-dimensional haptic signal operating through the respective force generators and the set of sequenced activations to change a source of the three-dimensional haptic signal, wherein the source of the three-dimensional haptic signal is moved along a directional component of the three-dimensional haptic signal and through the respective force generators of at least two respective occupant touch points of the plurality of occupant touch points, the at least two respective occupant touch points being positioned along the directional component.

11. The electrically-powered vehicle of claim 10, wherein the circular force generators are disposed proximate at least one of the frame, the body, and the plurality of seating positions.

12. The electrically-powered vehicle of claim 10, wherein the plurality of force generators further includes linear force generators.

13. The electrically-powered vehicle of claim 10, wherein the circular force generators are configured to selectively operate to produce the three-dimensional haptic signal relative to the plurality of seating positions, the three-dimensional haptic signal operating through a portion of the circular force generators operating according to the set of sequenced activations.

14. The electrically-powered vehicle of claim 10, wherein the circular force generators are configured to produce a haptic output that is operated by the controller, and wherein the haptic output includes an adjustable amplitude, an adjustable frequency and an adjustable duration.

15. The electrically-powered vehicle of claim 10, wherein the circular force generators are operated by the controller in a coordinated fashion to produce the directional component of the three-dimensional haptic signal that is delivered through a timed sequential path through the passenger cabin.

16. The electrically-powered vehicle of claim 10, wherein the body and the frame are formed as a single integral unibody component.

17. A vehicle comprising:

a frame;

a body coupled with the frame and defining a passenger cabin therein, the body having a plurality of interior sensors and a plurality of exterior sensors;

a plurality of resonating substrates that are incorporated into at least one of the frame and the body;

a plurality of seating positions within the passenger cabin, each seating position having a plurality of occupant touch points;

a first plurality of force generators positioned proximate the plurality of resonating substrates, the first plurality of force generators selectively operating on a portion of the plurality of resonating substrates to produce an auditory signal;

a second plurality of force generators positioned proximate the occupant touch points, the second plurality of force generators operating cooperatively with the occupant touch points to produce at least a haptic signal; and a controller in communication with the plurality of interior sensors, the plurality of exterior sensors, the first plurality of force generators, and the second plurality of force generators, wherein the controller operates the first plurality and the second plurality of force generators in response to sensed feedback from at least one sensor of the pluralities of interior sensors and exterior sensors to generate a three-dimensional signal that includes the auditory signal and the haptic signal, wherein the first plurality of force generators and the second plurality of force generators are operated in combination to produce a set of sequenced activations that produces the auditory signal and the haptic signal, respectively, and wherein the set of sequenced activations changes a source of at least the haptic signal, wherein the source of at least the haptic signal is moved along a directional component of the three-dimensional signal and the haptic signal and through a portion of the passenger cabin, wherein the source of at least the haptic signal originates through respective force generators of the second plurality of force generators of at least two touch points of the occupant touch points, the at least two touch points being positioned along the directional component.

18. The vehicle of claim 17, wherein the pluralities of first and second force generators are disposed proximate at least one of the frame, the body, and the plurality of seating positions.

19. The vehicle of claim 17, wherein the pluralities of first and second force generators are configured to selectively operate to produce the three-dimensional haptic signal relative to the plurality of seating positions, wherein the three-dimensional haptic signal is operated by the controller, and wherein the haptic signal includes an adjustable amplitude, an adjustable frequency and an adjustable duration.

20. The vehicle of claim 17, wherein the body and the frame are formed as a single integral unibody component.

* * * * *